V. WILLOUGHBY.
DRAFT GEAR YOKE.
APPLICATION FILED MAR. 5, 1913.

1,164,046.

Patented Dec. 14, 1915.

WITNESSES:
C. L. Belcher
Livingston Emmy

INVENTOR.
Victor Willoughby
BY J. H. Gibbs
ATTORNEY

UNITED STATES PATENT OFFICE.

VICTOR WILLOUGHBY, OF JEFFERSONVILLE, INDIANA, ASSIGNOR TO AMERICAN CAR AND FOUNDRY COMPANY, OF ST. LOUIS, MISSOURI, A CORPORATION OF NEW JERSEY.

DRAFT-GEAR YOKE.

1,164,046.  Specification of Letters Patent.  Patented Dec. 14, 1915.

Application filed March 5, 1913. Serial No. 752,190.

*To all whom it may concern:*

Be it known that I, VICTOR WILLOUGHBY, residing at Jeffersonville, Clark county, Indiana, and being a citizen of the United States, have invented certain new and useful Improvements in Draft-Gear Yokes, of which the following is a full, clear, and exact description, such as will enable others skilled in the art to which it appertains to make and to use the same, reference being had to the accompanying drawings which illustrate the preferred form of the invention, though it is to be understood that the invention is not limited to the exact details of construction shown and described, as it is obvious that various modifications thereof will occur to persons skilled in the art.

Figure 1:
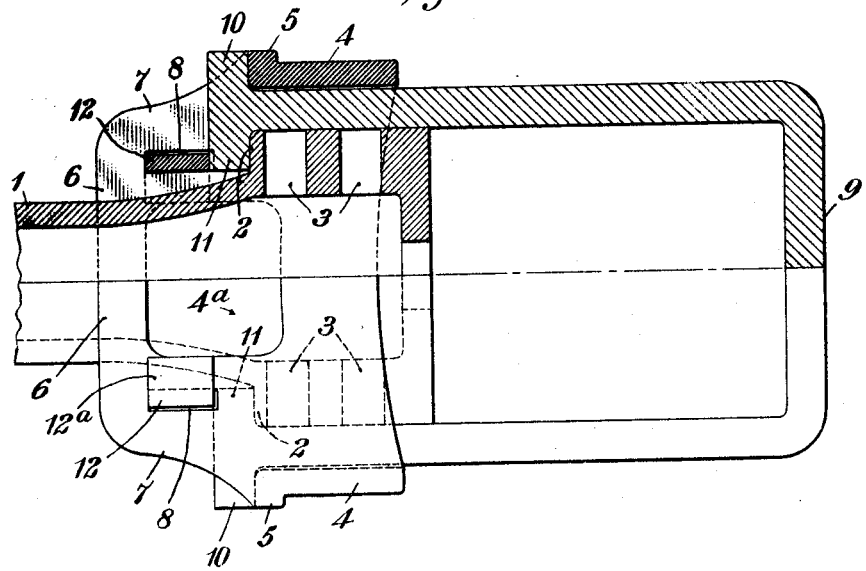
Figure 2:
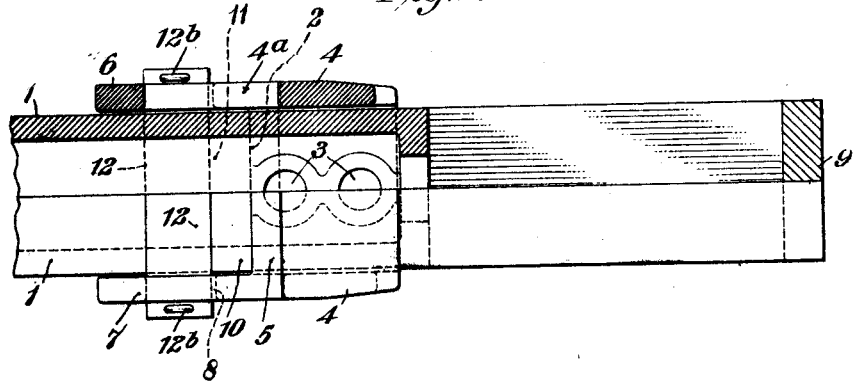

In said drawings: Figure 1 represents a side view of a device embodying my invention partially in section wherein the upper half thereof illustrates the longitudinal section. Fig. 2 represents a plan view of the same partially in section wherein the upper half represents a horizontal central section.

This invention relates to a simple, convenient and economical assemblage of draft gear yoke elements and comprehends in its adaptation the uniting of such elements by means that penetrate but one of the assembled elements. It also comprehends in its adaptation the securing of the yoke head and yoke strap in rigid conjunction and the draw bar or coupler shank in sliding conjunction with the yoke strap.

This device is particularly designed to lessen the tension or pulling stresses upon the yoke strap and at the same time facilitate the taking down or assemblage of the parts without destroying the connecting means. It is also designed to lighten the construction without sacrificing the strength of any of the parts.

Referring to the drawings, the coupler shank or draw bar 1 is preferably of cast metal and of the usual conventional form and is provided with an enlarged end forming shoulders 2, the said enlarged end being provided with rivet holes 3 which have in the usual construction been employed to rigidly connect the enlarged end of the coupler shank and the yoke strap. These rivet holes are not necessary in the construction of this invention but are merely shown as they exist in most of the conventional forms.

A hollow sleeve head 4 is provided with upwardly and downwardly extending shoulders 5 located at the top and bottom thereof and is also provided with a fork 6 extending forward on either side of the coupler shank 1, and the said fork is of considerably greater width than the vertical diameter of the said coupler shank. The upper and lower portions 7 of the fork that project above and below the coupler shank are provided with perforations or slots 8, and the body of the said fork is perforated or cut away as at 4ª to lighten the said fork, and as there is practically no strain at the point 4ª, the removal of this metal in no way impairs the strength of the said head.

A yoke strap 9 is provided with angular or offset portions 10 and 11 forming T's at the terminals of each leg of said yoke and these angular offset portions are adapted to abut the shoulders 5 of the hollow sleeve head 4 and the shoulders 2 of the enlarged end of the coupler shank. In former constructions of this nature, the T extension on the legs of the yoke strap sustained the entire weight of the tension or pulling stresses and, as the yoke strap in this instance and in fact, in almost all standard constructions is of wrought metal, such stresses would have a tendency to stretch the yoke strap or in fact might pull off the entire T extensions. To obviate this contingency keys 12 are provided that penetrate the slots 8 of the hollow sleeve head fork 6. These keys are preferably constructed of wrought metal and are provided with an angular stop 12ª at one end and a hole at the other for the insertion of a cotter pin 12ᵇ.

The perforations in the hollow sleeve head fork 6 are arranged with a slight lateral play for the keys and the bottoms of the said slots are preferably arranged in the plane of the inner edges of the T extensions 11 so that the said keys 12 will abut the faces of the T extensions of the yoke strap when the same are in position and thereby hold the yoke straps firmly between the shoulders 5 of the hollow sleeve head and the keys 12 located in the hollow sleeve head fork 6. By this arrangement it will be observed that the hollow sleeve head 4 and the yoke strap are practically rigidly connected and that the line of tension or pulling strain that emanates from the shoulders 2 of the enlarged end of the coupler shank is transmitted through the extensions 11 of the yoke T's to the keys 12 located in the hollow sleeve head fork 6. Another advantage of this construction is that the keys 12, as has been before said, are constructed from wrought metal so that a sudden tension or pulling shock would not be directly transmitted to the hollow sleeve head 4 or to the hollow sleeve head fork 6, both of which are integral and constructed of cast metal, but would be transmitted through the wrought metal extensions 11 of the yoke strap T's and the wrought metal keys 12, thereby cushioning such shock to a certain extent and eliminating much of the danger of fracturing the hollow sleeve head.

The operation of assembling the device of this invention is as follows: The coupler shank enlarged end or head 2 is inserted sidewise between the yoke strap legs and the hollow sleeve head 4 slid over the rear end of the yoke strap until the shoulders 5 abut the outer extensions 10 of the yoke strap T's. The keys 12 are then inserted into the slots 8 of the hollow sleeve head 6 and the cotter pin 12ª inserted into the ends thereof, thereby firmly holding the yoke strap and the hollow sleeve head in position. The gear may then be inserted behind the coupler shank enlarged end or head, forcing the shoulders 2 of the same into contact with the inner extensions 11 of the yoke strap T's.

To take down the device, this operation is reversed.

What I claim is:—

1. In a device of the class described, a draw bar and an imperforate yoke strap, a hollow head embracing the same and provided with an extending perforated fork and with means fitting some of the said perforations of said fork and adapted to unite the parts of the device together.

2. In combination, a shouldered coupler shank, a yoke strap having shouldered ends adapted to engage shoulders on the coupler shank, outwardly extending shoulders on said yoke strap, a hollow head adapted to slide freely longitudinally of said yoke strap into contact with the said outwardly extending shoulders, and transversely extending keys projected through said hollow head between a part of said head and said yoke strap.

3. In combination, a coupler shank provided with shoulders, a yoke providing a loop and having angular ends engaging said shoulders, oppositely extending shoulders on said yoke, a slotted hollow head adapted to be slipped into position from the loop end of said yoke into engagement with said oppositely extending projections on said yoke and keys penetrating said head clear of said coupler shank and said yoke adapted to lock all of said parts in operative engagement.

4. In combination, a draw bar having a shouldered shank portion, a yoke strap having offset ends adapted to engage the shouldered portion of said shank, a hollow head inclosing the said shank and said yoke strap at one side of the offset portions of the strap, said head having forwardly extending portions lapping the draw bar at the opposite side of said offset portions and keys penetrating said forwardly extending portions of the head and adapted to contact with said yoke strap.

In witness whereof I have hereunto set my hand in the presence of two witnesses.

VICTOR WILLOUGHBY.

Witnesses:
 THEODORE E. LYONS,
 C. C. EASTMAN.